(No Model.) 3 Sheets—Sheet 1.
W. G. STITT, J. LOWBRIDGE & A. ROSENKRANZ.
CAR STARTER AND BRAKE.
No. 288,678. Patented Nov. 20, 1883.
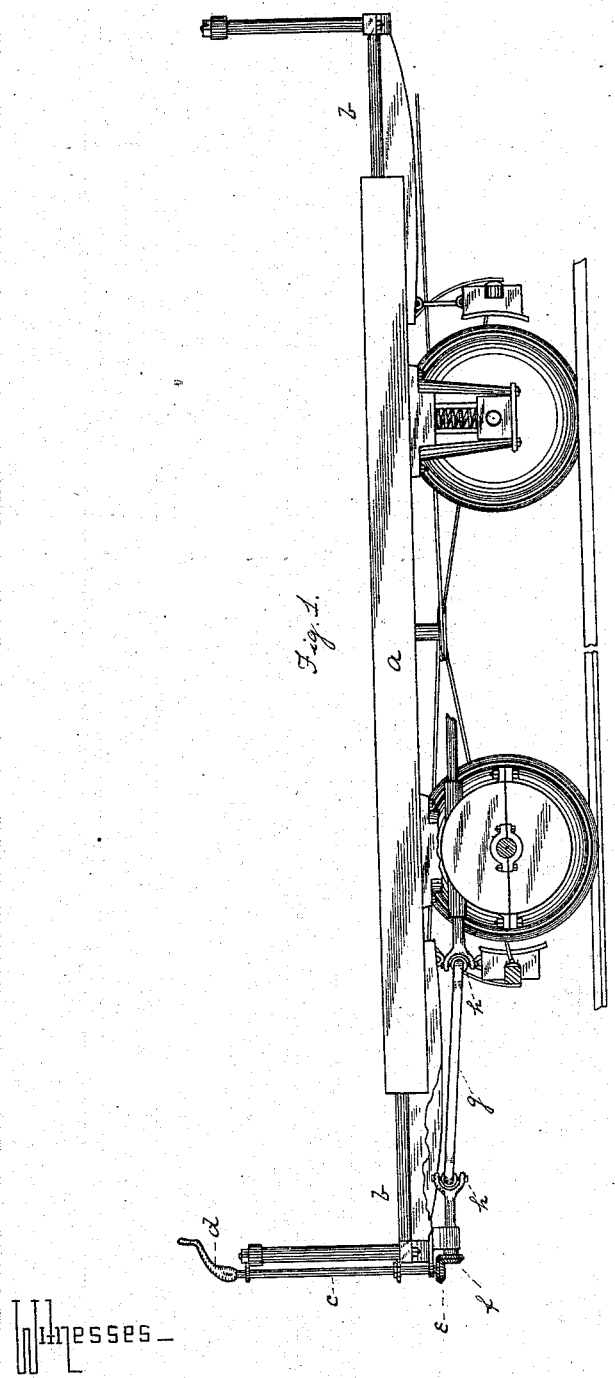

(No Model.) 3 Sheets—Sheet 2.
W. G. STITT, J. LOWBRIDGE & A. ROSENKRANZ.
CAR STARTER AND BRAKE.
No. 288,678. Patented Nov. 20, 1883.
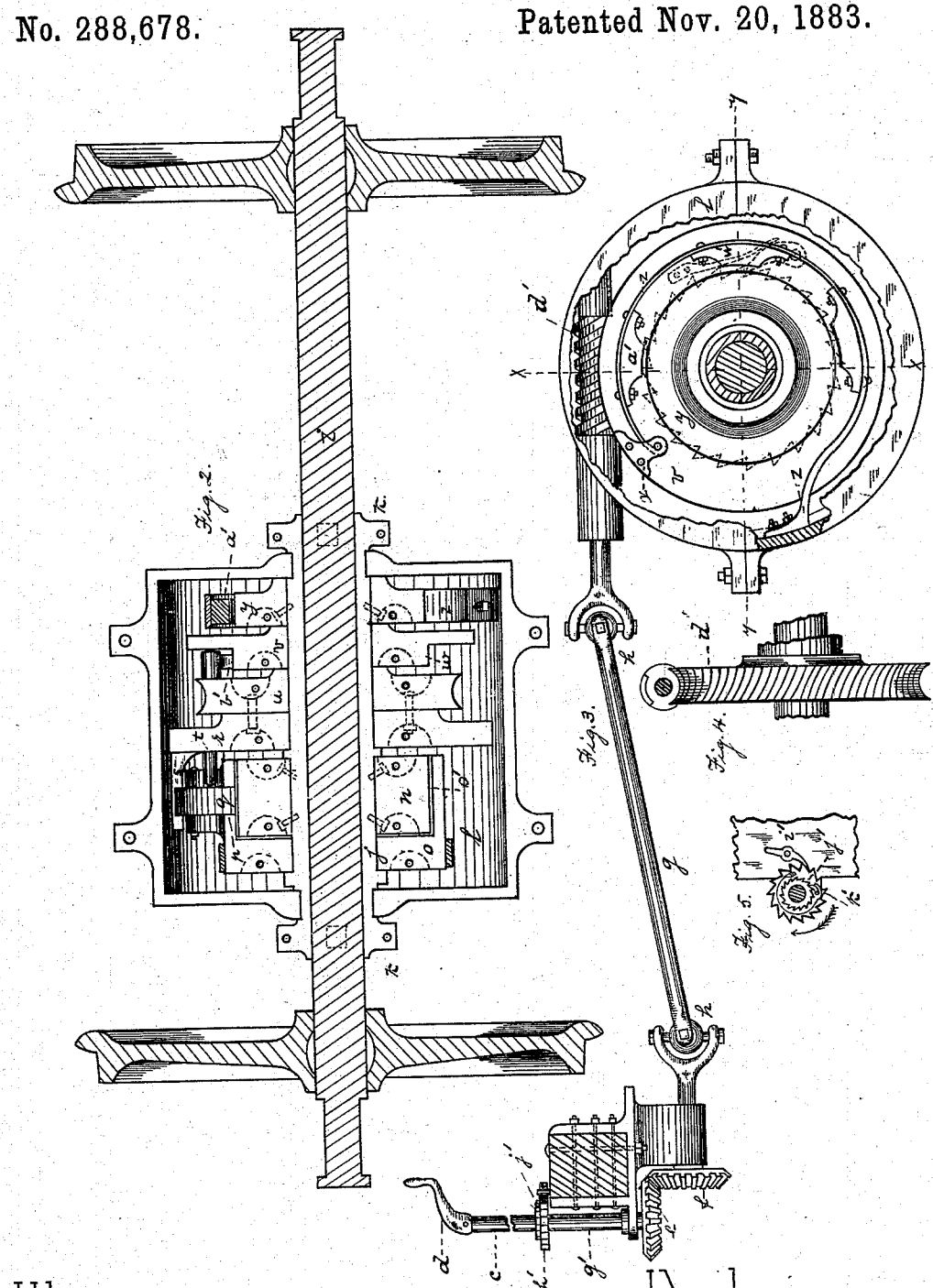
Witnesses.
W. B. Corwin
Jno. K. Smith
Inventor.
Adam Rosenkranz
Jabez Lowbridge
Washington G. Stitt
by their attorneys
Bakewell & Kerr (No Model.) 3 Sheets—Sheet 3.
W. G. STITT, J. LOWBRIDGE & A. ROSENKRANZ.
CAR STARTER AND BRAKE.
No. 288,678. Patented Nov. 20, 1883.
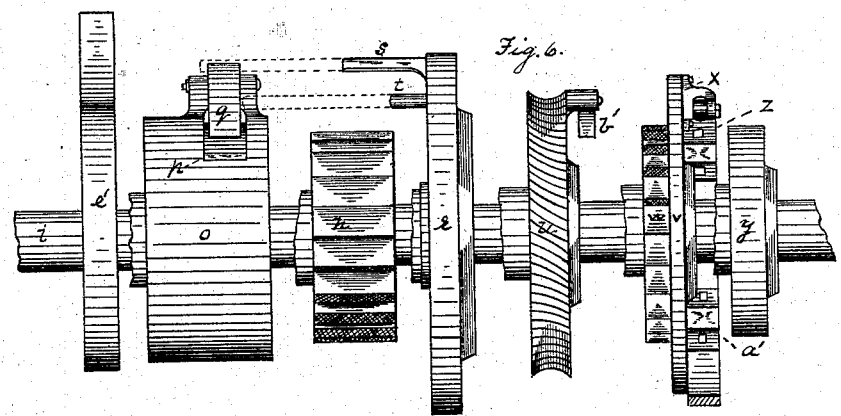
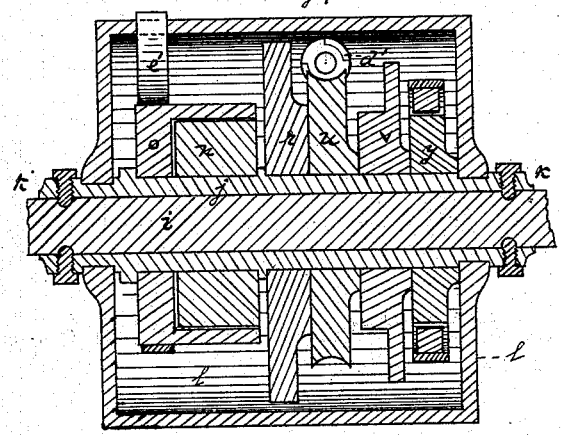
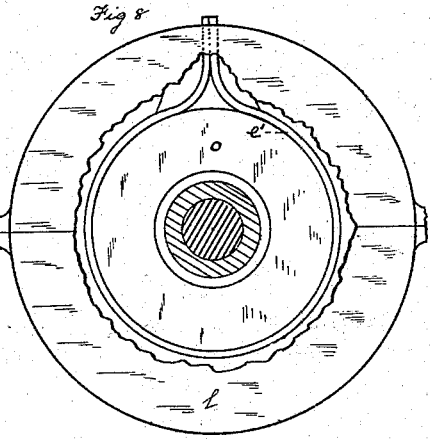

UNITED STATES PATENT OFFICE.

WASHINGTON G. STITT, JABEZ LOWBRIDGE, AND ADAM ROSENKRANZ, OF ALLEGHENY, PENNSYLVANIA, ASSIGNORS OF ONE-HALF TO PETER WALTER, JR., OF SAME PLACE.

CAR STARTER AND BRAKE.

SPECIFICATION forming part of Letters Patent No. 288,678, dated November 20, 1883.

Application filed August 10, 1883. (No model.)

*To all whom it may concern:*

Be it known that we, WASHINGTON G. STITT, JABEZ LOWBRIDGE, and ADAM ROSENKRANZ, of the city of Allegheny, in the county of Allegheny and State of Pennsylvania, have invented a new and useful Improvement in Mechanism for Applying Motive Power to Street-Cars and other Vehicles; and we do hereby declare the following to be a full, clear, and exact description thereof.

Our invention relates to an improvement in car-starting mechanism so arranged as to transmit power from a hand-wheel, crank, or other source to the axle or wheels of a car or other vehicle, and a brake-connection therewith for stopping the car.

It is well known that in starting street-cars the power required to overcome the inertia of the car taxes the strength of the horses and exhausts them to a much greater extent than the exertion required to draw the car after it has attained a certain amount of momentum. It is, therefore, the object of my invention to provide a means by which this inertia may be overcome by the driver of the car, and a certain amount of momentum having been attained thereby, the horses are relieved from the sudden strain and are enabled to draw the car with ease.

Our invention is adapted not only for the purpose of relieving the horses of street-cars, but also as well for the purpose of transmitting a power having a rapid motion, such as is produced by steam or an electric motor, to the axle and wheels of a car, diminishing the speed and increasing the power without any serious loss from friction or other causes.

We will now describe our invention, so that others skilled in the art may manufacture and use the same, reference being had to the accompanying drawings, forming part of this specification, in which—

Figure 1 is a side elevation of the bed and wheels of a street-car, showing our improvement. Fig. 2 is a horizontal longitudinal section through the axle of the car, showing the drum and mechanism contained therein, by which the power transmitted from the hand-crank by a horizontal shaft is applied to the axle. Fig. 3 is a side elevation of the hand-crank, horizontal shaft, and drum, partly in section, showing the brake mechanism. Fig. 4 is a detached view of the worm at the end of the horizontal shaft. Fig. 5 is a detached view of the drum and ratchet on the vertical shaft of the hand-crank, the purpose of which is to relieve the power from the car-starting mechanism and apply it to an ordinary brake. Fig. 6 is a side elevation of the axle and mechanism for applying the power to the axle, the different parts of which are detached and separated, so as to bring them all in view. Fig. 7 is a vertical longitudinal section through the axle and mechanism, on the line X X, Fig. 3. Fig. 8 is an end view, partly broken away, showing the disk O and friction-band.

Like letters indicate like parts wherever they occur.

In the drawings, A represents the bed or frame of the car, having a platform, B B, at each end thereof.

Attached to the front platform is the usual vertical brake-shaft, C, which we employ, however, as well for the purpose of transmitting power to car-starting mechanism. At the upper end of this shaft is the hand-crank D, and at the lower end of the shaft is the beveled-gear wheel E, which meshes into the teeth of a beveled-gear wheel, F, on the end of the horizontal shaft G. This shaft G extends horizontally under the bed of the car to the mechanism connected with the axle, and it is provided with two ball-and-socket or universal joints, H H, which allow for any motion between the body of the car and the axle.

Bolted to the axle I is the sleeve J, having collars K K formed at the end thereof. Between these collars, fitting loosely on the sleeve J, is the drum L.

Around the sleeve J, in the casing L, keyed thereto, is the ratchet-wheel N.

Fitting over the ratchet-wheel N, on the sleeve J, is a disk, O, having an annular space, O', on its inner circumference, to permit the ratchet-wheel to revolve with the axle without interfering with or moving the disk. Extending through this sleeve O into the space referred to, above the ratchet-wheel, is a slot or opening, P, and in this slot is a dog or ratchet, Q, which is pivoted near one of its ends to the disk, while the other end, extending through the opening P onto the annular space O', engages with the ratchet-wheel N.

Fitting loosely on the sleeve J, next to and at the side of the disk O, is a circular disk, R, extending horizontally from the face of which are two arms, S T, which embrace the end of the dog or ratchet Q, which projects from the slot P above the pivotal point. The purpose of the arm S is to press the dog down onto the ratchet-wheel N, while the arm T prevents the disk R and arm S from being moved out of position.

Fitting loosely on the sleeve J and bolted to the disk R is a worm-wheel, U. Next to the worm-wheel U, and fitting loosely on the sleeve J, is a wheel or disk, V, provided with ratchet-teeth W on its periphery, which ratchet-teeth point in the opposite direction to the teeth on the ratchet-wheel N. On the face of this wheel V, away from the worm-wheel U, is a lug, X, which extends horizontally over the disk Y. This disk is keyed to the sleeve J.

Attached to the side of the drum or casing L is a circular band-spring, Z, which extends around a portion of the periphery of the wheel Y, and the other end of which is bolted to the lug X. Between the periphery of the wheel Y and the spring-band Z are shoes A'.

Pivoted to the side of the worm-wheel U is a dog, B', which engages with the ratchet-teeth W. This dog is held in place by the spring W'.

In the side of the drum or casing L, which drum is stationary, fitting loosely on the sleeve J, there is an opening, C', through which extends the horizontal shaft G. Inside of the casing on this shaft is a worm, D', which engages with the worm-wheel U, and imparts power thereto from the shaft.

Around the disk O is a friction-band, E', the ends of which pass through the drum L, and are secured thereto.

The operation is as follows: When it is desired to start the car, the driver, by turning the hand-crank D, imparts motion through the vertical shaft C and horizontal shaft G to the worm-wheel U. When the worm-wheel revolves, slipping on the sleeve J, the arm S comes in contact with the dog Q, and thereby carries the disk O with it in its rotary movement; but the loose end of the dog Q, being forced down, engages with the ratchet-wheel N, and thereby causes the sleeve J and axle to revolve, and as the axle is keyed to the wheels, the car is set in motion. The friction-band E' bears on the face of the disk O sufficiently to prevent the sleeve from being caused to rotate from the friction between the sleeve and the disk, and to overcome the resistance of the spring under the dog Q, and yet it does not prevent the sleeve from being rotated by the arm S. After the car has been set in motion and the driver ceases to turn the crank D, the worm-wheel U remains stationary, and also the disk O, while the ratchet-wheel N continues to rotate with the sleeve J and the axle, the dog Q being released from the ratchet-teeth. In order to prevent the disagreeable clicking of the dog over the teeth of the ratchet, a spring is placed under the dog to release and lift it when the pressure of the arm S is removed. In order to stop the car, the crank D is turned in the reverse direction, which causes the worm-wheel U to also revolve in a reverse direction, and the dog B' to engage in the ratchet-teeth W, thereby turning the wheel or disk V and tightening the spring-band Z, causing the shoes A' to bear on the periphery of the wheel Y, which wheel, being keyed to the sleeve J, turns with the axle. The friction caused by this pressure gradually stops the revolution of the axle and wheels. During this reverse motion of the worm-wheel the disk O is caused to revolve in a reverse direction by the arm T, so as to retain its relative position, but the dog Q does not interfere with the ratchet-wheel N.

When it is desired that the common form of brake should be used, a drum, G', is placed loosely around the vertical shaft C, the drum having a ratchet-wheel, H', formed on the top thereof, which engages with a pawl, I', to retain the drum when the brake is put on. Around the shaft C, and keyed thereto, is a ratchet-wheel, J', which engages with a pawl, K', on the top of the drum G'. When the car-starting mechanism is being operated the drum G' remains stationary, but when the crank is turned in the reverse direction the ratchet-wheel J' engages with the pawl K', and the drum is carried around with the shaft. As the brake-chain is attached to the drum, it is wound up and the brake is drawn against the wheels.

Instead of having the shaft G attached to the brake-shaft D, as described, it may be connected with a steam-engine or electric motor placed on the car.

Having thus described our invention, what we claim, and desire to secure by Letters Patent, is—

1. In a car or vehicle starter or propeller, the combination of a ratchet-wheel secured to the axle, a pawl-disk journaled loosely on the axle, and a power-disk, also loosely on the axle, and provided with devices for clutching the pawl-disk, substantially as and for the purposes specified.

2. A car or vehicle starter or propeller, consisting of a worm-wheel fitting loosely on the axle of the car, and adapted to engage with a disk which is also loosely mounted on the axle, and provided with a dog which engages with a ratchet-wheel keyed to the axle, and a worm connected with the brake-crank at the end of the car by a horizontal shaft, substantially as and for the purpose specified.

3. In a combined car starter or propeller and brake, the combination, with a power-disk journaled loosely on the axle and provided with clutch mechanism, a pawl-disk, and a ratchet-wheel, also loosely journaled on the axle, of a reversely-toothed ratchet-wheel secured to the axle, a brake-band having one end secured to the loose ratchet-wheel, and the other to a fixed point, and a brake-disk secured to the axle, substantially as and for the purposes specified.

4. In a car starter or propeller, the combination of a ratchet-disk secured to the axle, a pawl-disk loosely journaled on the axle, and a power-disk, also loosely journaled on the axle, and provided with a pin or lug for actuating the pawl of the pawl-disk, substantially as and for the purposes specified.

5. The combination, with mechanism for starting or propelling a car or vehicle, of a power-wheel journaled loosely on the axle and provided with a pawl, which engages with a reversely-toothed ratchet-wheel, a reversely-toothed ratchet-wheel journaled loosely on the axle, a brake-band secured thereto and having one end secured to a fixed point, and a brake-disk secured to the axle, substantially as and for the purposes specified.

In testimony whereof we have hereunto set our hands this 4th day of August, A. D. 1883.

WASHINGTON G. STITT.
JABEZ LOWBRIDGE.
ADAM ROSENKRANZ.

Witnesses:
JOHN S. KENNEDY,
JAMES K. BAKEWELL.